United States Patent
Troy et al.

(10) Patent No.: US 10,627,475 B2
(45) Date of Patent: Apr. 21, 2020

(54) POSE ESTIMATION USING RADIO FREQUENCY IDENTIFICATION (RFID) TAGS

(71) Applicant: THE BOEING COMPANY, Chicago, IL (US)

(72) Inventors: James J. Troy, Issaquah, WA (US); Christopher Esposito, Issaquah, WA (US); Vladimir Karakusevic, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 132 days.

(21) Appl. No.: 15/588,489

(22) Filed: May 5, 2017

(65) Prior Publication Data
US 2018/0321352 A1   Nov. 8, 2018

(51) Int. Cl.
*G01S 5/02* (2010.01)
*G01S 5/08* (2006.01)

(52) U.S. Cl.
CPC .......... *G01S 5/0247* (2013.01); *G01S 5/0252* (2013.01); *G01S 5/0263* (2013.01); *G01S 5/08* (2013.01)

(58) Field of Classification Search
CPC .... G01S 5/0247; G01S 5/0252; G01S 5/0263; G01S 5/08; G01S 5/10; G06K 7/10128
See application file for complete search history.

(56) References Cited

U.S. PATENT DOCUMENTS

| | | | |
|---|---|---|---|
| 7,859,655 B2 | 12/2010 | Troy et al. | |
| 8,044,991 B2 | 10/2011 | Lea et al. | |
| 8,138,938 B2 | 3/2012 | Troy et al. | |
| 2007/0120677 A1* | 5/2007 | Park | G06K 7/0008 340/572.4 |
| 2008/0266106 A1* | 10/2008 | Lim | G01O 21/20 340/572.7 |
| 2009/0195358 A1* | 8/2009 | Vennelakanti | G06K 7/0008 340/10.1 |
| 2015/0108210 A1 | 4/2015 | Zhou | |
| 2016/0318625 A1 | 11/2016 | Troy et al. | |
| 2016/0358440 A1* | 12/2016 | Trivelpiece | G06K 7/0008 |
| 2017/0032159 A1 | 2/2017 | Troy et al. | |
| 2019/0058969 A1* | 2/2019 | Ambha Madhusudhana | H04W 4/027 |

FOREIGN PATENT DOCUMENTS

WO    2010053809 A1    5/2010

OTHER PUBLICATIONS

Extended European Search Report for Application No. 18161609.5 dated Sep. 18, 2018, 8 pgs.
Communication pursuant to Article 94(3) EPC for application No. 18161609.5 dated Jan. 14, 2020.

* cited by examiner

*Primary Examiner* — Marisol Figueroa
(74) *Attorney, Agent, or Firm* — Moore IP Law

(57) ABSTRACT

An apparatus includes a directional scanner configured to receive signals from at least three RFID tags at a plurality of orientations of the directional scanner. The apparatus includes a pose estimator configured to estimate a pose of a device that includes or is coupled to the directional scanner based on orientation data indicating orientations of the directional scanner associated with determined peak signal strengths associated with the at least three RFID tags.

20 Claims, 9 Drawing Sheets

POSE ESTIMATION USING RADIO FREQUENCY IDENTIFICATION (RFID) TAGS

FIELD OF THE DISCLOSURE

The present disclosure relates to pose estimation.

BACKGROUND

Optical technologies (e.g., motion capture) and global positioning systems (GPS) have been used to determine a three dimensional (3D) location of a measurement device. However optical solutions are very sensitive to line of sight (occlusion) issues. Additionally, GPS is unreliable in closed spaces, where access to a GPS signal is limited.

SUMMARY

In some implementations, an apparatus includes a directional scanner configured to receive signals from at least three RFID tags at a plurality of orientations of the directional scanner. The apparatus includes a pose estimator configured to estimate a pose of a device that includes or is coupled to the directional scanner based on orientation data indicating orientations of the directional scanner associated with determined peak signal strengths associated with the at least three RFID tags.

In some implementations, a method includes receiving signals from at least three RFID tags at a plurality of orientations of a directional scanner. The method includes estimating a pose of a device that includes or that is coupled to the directional scanner based on orientation data indicating orientations of the directional scanner associated with determined peak signal strengths associated with the at least three RFID tags.

In some implementations, an apparatus includes means for receiving signals from at least three RFID tags at a plurality of orientations of the means for receiving signals. The apparatus additionally includes means for estimating a pose of a device that includes or that is coupled to the directional scanner based on orientation data indicating orientations of the means for receiving signals associated with determined peak signal strengths associated with the at least three RFID tags.

The features, functions, and advantages described herein can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Examples described herein enable determining a position, orientation, or both (e.g., a pose), of an instrument (e.g., a device) relative to an environment (e.g., to an object in an environment) based on determined peak signal strengths of signals from at least three non-collinear radio frequency identification (RFID) tags. For example, the instrument or device may be associated with an instrument coordinate system (or a "device coordinate system") and the environment (e.g., object) may be associated with an environment coordinate system (or an "object coordinate system"). In this example, the implementations may determine a transformation matrix between the instrument coordinate system and the environment coordinate system based in part on the determined peak signal strengths of signals from at least three non-collinear RFID tags. The transformation matrix may be determined using a three point algorithm, a five point algorithm, a seven point algorithm, or another type of algorithm. The transformation matrix may be used to determine a position, orientation, or both, of the instrument relative to the environment coordinate system. The transformation matrix, the position, the orientation, or a combination thereof, may be used in three dimensional (3D) visualization applications, navigation (e.g., automobile or robotic navigation) applications, or other types of localization applications.

Figure 1:
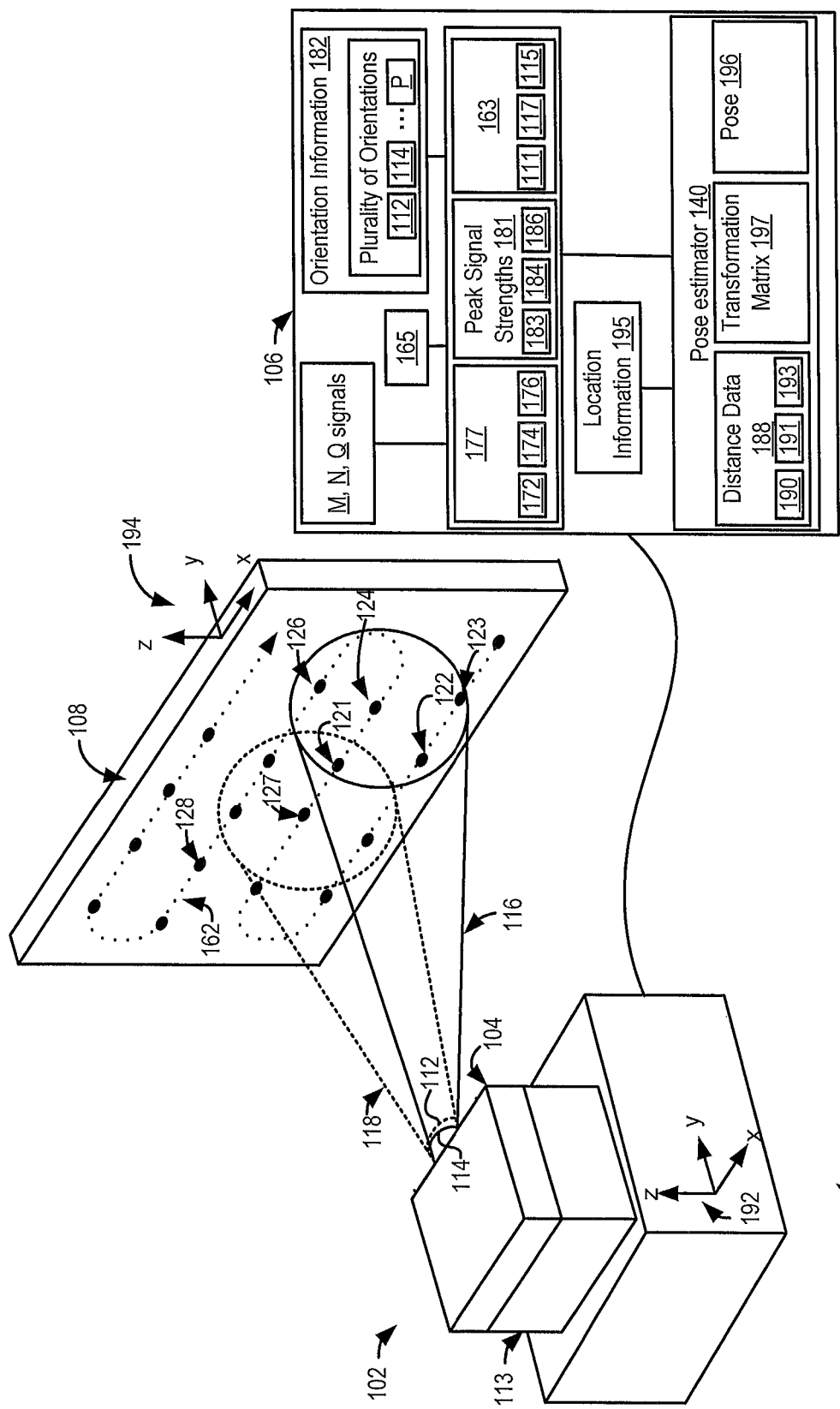
FIG. 1 illustrates an example of a positioning system that includes a radio frequency identification (RFID) scanner and that is configured to determine a pose estimation based on signals received from at least three RFID tags.

FIG. 1 illustrates a diagram of a positioning system 100. The positioning system 100 includes a device 102 (e.g., an instrument) that includes or that is coupled to a directional scanner 104 (e.g., a directional RFID scanner, a directional RFID reader, or a directional RFID interrogator). FIG. 1 depicts the directional scanner 104 oriented at orientations 112, 114 during a scan of an object 108 by the directional scanner 104 along a scan path 162. The orientations 112, 114 include a first orientation 112 (depicted using a solid line) and a second orientation 114 (depicted using a dashed line). Multiple RFID tags, such as the RFID tags 121, 122, 123, 124, 126, 127, and 128 are associated with the object 108. In some examples, the multiple RFID tags are affixed to the object 108. In some examples, the multiple RFID tags (e.g., including the RFID tags 121, 122, 123, 124, 126, 127, and 128) are passive RFID tags. During the scan of the object along the scan path 162, RFID tags move in and out of the coverage region of the beam of the directional scanner 104. For example, at the first orientation 112, the RFID tags 121, 123, 124, and 126 are within a coverage region of the directional scanner 104. As the directional scanner 104 is moved along the scan path, one or more of the RFID tags 121, 123, 124, and 126 move in and out of the coverage region of the directional scanner 104. For example, at the second orientation 114, the RFID tags 123, 124, and 126 are no longer within a coverage region of the directional scanner 104.

The positioning system 100 includes a processor 106 configured to determine a pose of the device 102 relative to the object 108. In some examples, the device 102 includes the processor 106. In other examples, the device 102 is coupled to (e.g., communicatively coupled to) the processor 106. The processor 106 uses orientation angle data along with signal strength data to determine the three-dimensional (3D) positions of at least three RFID tags 124, 127, 128 relative to the device 102 as described in more detail below. The processor 106 is configured to compare those measured positions to known relative positions of the at least three RFID tags 124, 127, 128 within the known pattern on the object 108. The comparison uses a vector alignment process to determine the 3D location (i.e., position and orientation offset) of the device 102 relative to the known pattern.

Although the description focuses on using three points (e.g., three RFID tags) in conjunction with a three point algorithm to determine a pose estimation, in other examples, the at least three RFID tags 124, 127, 128 include more than three RFID tags. To illustrate, in some examples, five RFID tags and a five point algorithm is used to determine the pose of the device 102. In other examples, seven RFID tags and a seven point algorithm is used to determine the pose of the device 102.

The directional scanner 104 is directional in the sense that a radiation gain pattern of the directional scanner 104 includes a dominant lobe (e.g., a main lobe). In some examples, the directional scanner 104 is a unidirectional scanner. A detection region of the directional scanner 104 is based on an orientation of the dominant lobe of the directional scanner 104. The orientation of the dominant lobe of the directional scanner 104 (and thus the detection region of the directional scanner 104) is based on a physical orientation of the directional scanner 104, a phased array setting (e.g., a setting that controls a phase delay between elements of a phased array antenna) of the directional scanner 104, or both.

During operation, an orientation of the directional scanner 104 is changed to a plurality of orientations 112, 114 . . . P as the device 102 scans along the scan path 162. Each of the plurality of orientations 112, 114 . . . P is associated with a different orientation of a detection region of the directional scanner 104. In the example illustrated in FIG. 1, the first orientation 112 is associated with a detection region 116 and the second orientation 114 is associated with a detection region 118.

In some examples, each of the plurality of orientations 112, 114 . . . P corresponds to a different physical orientation of the directional scanner 104. In some examples, the first orientation 112 corresponds to a different physical orientation of the directional scanner 104 than the second orientation 114. In these examples, the device 102 is configured to be physically moved to the plurality of orientations 112, 114 . . . P. For example, the device 102 may be moved using a gimbal 204 as described below with reference to FIG. 2. Alternatively, the device 102 may be configured to be moved manually, as described below with reference to FIGS. 3 and 4.

In other examples, each of the plurality of orientations 112, 114 . . . P of the directional scanner 104 corresponds to a different orientation of the detection region at a single physical orientation of the directional scanner 104. To illustrate, in some examples the directional scanner 104 corresponds to or employs a phased array antenna, and the directional scanner 104 is configured to change the detection region of the directional scanner 104 by shifting a phase, a gain, or both, of a signal emitted by or received by each of multiple radiating elements to cause the directional scanner 104 to receive signals from one or more of the at least three RFID tags 124, 127, 128 at the plurality of orientations 112, 114 . . . P of the directional scanner 104. In these examples, the plurality of orientations 112, 114 . . . P of the directional scanner 104 corresponds to a plurality of orientations of the main lobe of the directional scanner 104 at a single physical orientation of the directional scanner 104.

In some examples that employ a phased array antenna, the directional scanner 104 employs a wide-angle interrogator (that does not employ a phase array antenna), and the phased array antenna is employed to provide directional reception. Alternatively, in some examples that employ a phased array antenna, the directional scanner 104 uses the phased array antenna to employ beamforming during interrogation and uses a wide angle antenna for reception. Alternatively or additionally, in some examples that employ a phased array antenna, the directional scanner 104 uses the phased array antenna for both interrogation and reception.

The positioning system 100 includes an orientation detector 113 configured to provide orientation information 182 indicative of an orientation of the device 102 relative to a device coordinate system 192 (or an "instrument coordinate system") at each of the plurality of orientations 112, 114 . . . P of the directional scanner 104.

In some examples, the device 102 is configured to be physically moved to the plurality of orientations 112, 114 . . . P. In some examples in which the device 102 is configured to be physically moved, the orientation detector 113 corresponds to an inertial measurement unit (IMU), and the orientation information 182 indicates a pan angle, a tilt angle, and a roll angle, or a combination thereof, of the directional scanner 104 at each of the plurality of orientations 112, 114 . . . P.

Figure 2:
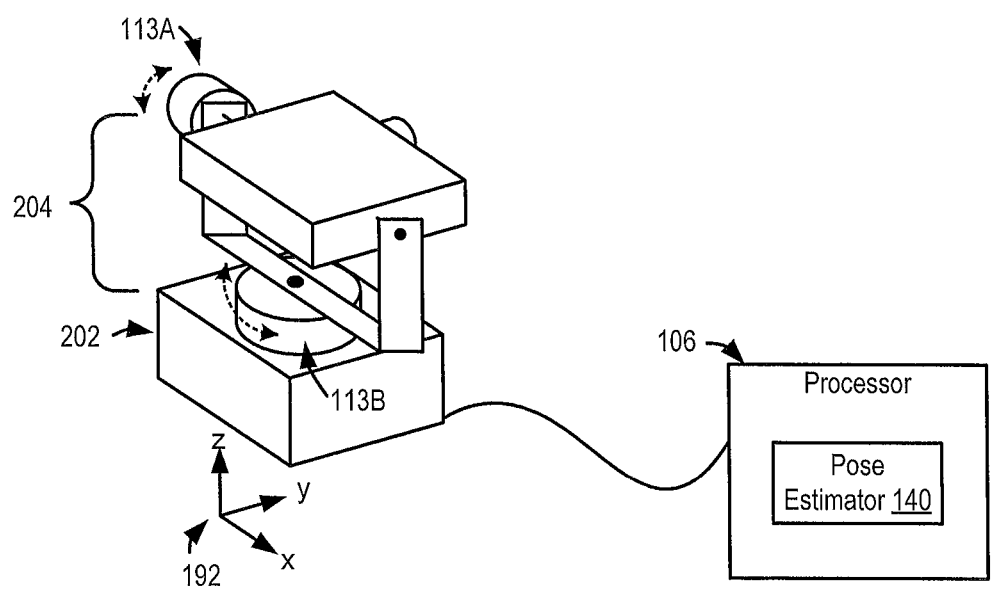
FIG. 2 illustrates an example of the positioning system of FIG. 1 that is configured to adjust a physical orientation of the positioning system using a gimbal.

In some examples in which the device 102 is configured to be physically moved to the plurality of orientations 112, 114 . . . P, the directional scanner 104 is configured to be physically moved using a gimbal (e.g., a motorized gimbal) that includes rotation sensors 113A, 113B that are configured to provide the orientation information 182. To illustrate, FIG. 2 depicts an example of the positioning system 100 that includes the gimbal 204 (e.g., a multi-axis gimbal). The gimbal 204 includes the rotation sensors 113A, 113B. In this example, the rotation sensor 113A (for example a rotational encoder) corresponds to a tilt angle sensor for measuring a tilt angle of the directional scanner 104 relative to the base 202, and the rotation sensor 113B corresponds to a pan angle sensor for measuring a pan angle of the directional scanner 104 relative to the base 202. Together, the rotation sensors 113A and 113B are configured to provide a pan angle, a tilt angle, or a combination thereof, of the device 102 relative to the device coordinate system 192 at the first orientation 112 of FIG. 1. In some examples, the orientation detector 113 time stamps the pan angle, the tilt angle, or the combination thereof, associated with the first orientation 112, and time stamps the pan angle, the tilt angle, or the combination thereof, associated with the second orientation 114.

Figure 3:
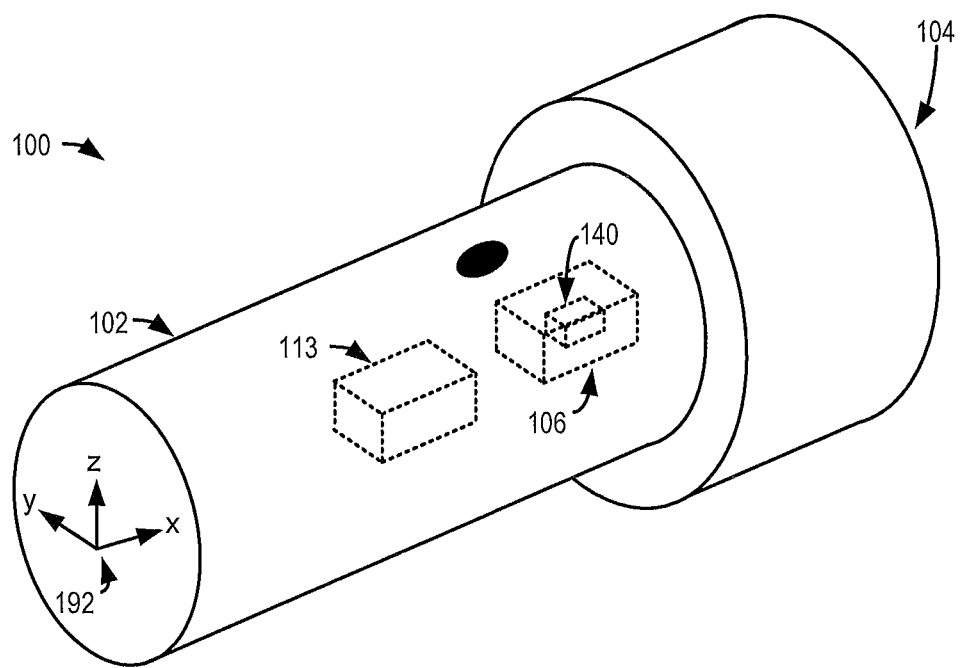
FIG. 3 illustrates an example of the positioning system of FIG. 1 configured to be manually re-oriented.
Figure 4:
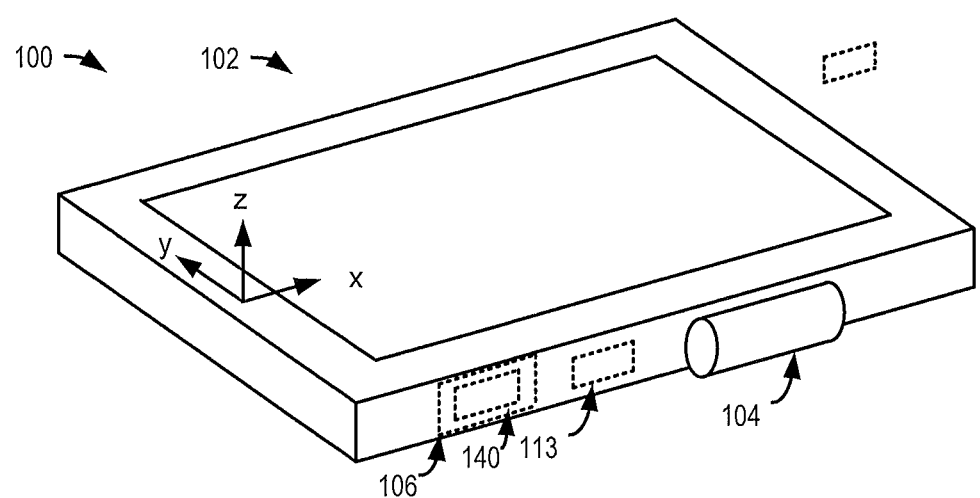
FIG. 4 illustrates an example of the positioning system of FIG. 1 embodied in a mobile communication device.

In other examples in which the device 102 is configured to be physically (e.g., manually) moved to the plurality of orientations 112, 114 . . . P, the directional scanner 104 is configured to be manually physically moved. To illustrate, FIG. 3 depicts the positioning system 100 of FIG. 1 as a flashlight type device. The positioning system 100 of FIG. 3 is configured to be physically moved (e.g., along a scan path) to collect one or more signals at the plurality of orientations 112, 114 . . . P. As another example, FIG. 4 depicts the positioning system 100 of FIG. 1 as a mobile communications device that is configured to be physically moved (along a scan path) to collect signals and to determine the pose as described in more detail below. The positioning systems 100 of FIGS. 3 and 4 include the orientation detector 113. In some examples, the orientation detector 113 of FIGS. 3 and 4 corresponds to an IMU (e.g., a six-axis IMU) to provide a pan angle, a tilt angle, a roll angle, or a combination thereof, of the device 102 of FIGS. 3 and 4.

In other examples, the device 102 is configured to be oriented in the plurality of orientations 112, 114 . . . P by changing orientations of the beam of the directional scanner 104 using a phased array antenna. In some of these examples, the orientation detector 113 corresponds to a phased array controller (e.g., a beamformer) [not illustrated], and the orientation information 182 indicates a pan angle, a tilt angle, a roll angle, or a combination thereof, of the beam of the phased array at each of the plurality of orientations 112, 114 . . . P.

The device 102 is configured to receive a signal from one or more of the at least three RFID tags 124, 127, 128 at multiple orientations of the plurality of orientations 112, 114 . . . P of the directional scanner 104. For example, during operation, the device 102 may receive M signals from the RFID tag 124 at M particular orientations (of the plurality of orientations 112, 114 . . . P) as the device 102 scans along the scan path 162. As another example, during operation, the device 102 may receive N signals from the RFID tag 127 at N particular orientations (of the plurality of orientations 112, 114 . . . P) as the device 102 scans along the scan path 162. As another example, during operation, the device 102 may receive Q signals from the RFID tag 128 at Q particular orientations (of the plurality of orientations 112, 114 . . . P) as the device 102 scans along the scan path 162.

The directional scanner 104 receives signals at a particular orientation of the directional scanner 104 from RFID tags that are within the detection region of the directional scanner 104 at the particular orientation. In some examples, the detection region of the directional scanner 104 does not include all of the at least three RFID tags 124, 127, 128 at each of the plurality of orientations 112, 114 . . . P. In these examples, the device 102 does not receive a signal from all of the at least three RFID tags 124, 127, 128 at each of the plurality of orientations 112, 114 . . . P. In these examples, the signals received from the at least three RFID tags 124, 127, 128 at the plurality of orientations 112, 114 . . . P do not include a signal from all of the at least three RFID tags 124, 127, 128 at each of the plurality of orientations 112, 114 . . . P. In some examples, the set of M particular orientations at which the device 102 receives a signal from the RFID tag 124 is different than the set of N particular orientations at which the device 102 receives a signal from the RFID tag 127, and the set of the M particular orientations at which the device 102 receives a signal from the RFID tag 124 is different than the set of Q particular orientations at which the device 102 receives a signal from the RFID tag 128. Additionally or alternatively, in some examples, the set of N particular orientations at which the device 102 receives a signal from the RFID tag 127 is different than the set of Q particular orientations at which the device 102 receives a signal from the RFID tag 128.

Alternatively or additionally, in some examples, the set of M particular orientations includes or corresponds to the same orientations as the set of N particular orientations. Alternatively or additionally, the set of N particular orientations includes or corresponds to the same orientations as the set of Q particular orientations. Alternatively or additionally, in some examples, the set of M particular orientations includes or corresponds to the same orientations as the set of Q particular orientations.

The signals received from the RFID tags encode tag identification information that enables the processor 106 to distinguish between signals from the RFID tags. To illustrate, in some examples, the M signals include a first tag identification (e.g., a tag ID), the N signals include a second tag ID, and the Q signals include a third tag ID. In these examples, the first tag ID is different than the second tag ID and the third tag ID, and the second tag ID is different than the third tag ID, thus enabling the processor 106 to determine that the M signals are transmitted by the RFID tag 124, that the N signals are transmitted by the RFID tag 126, and that the Q signals are transmitted by the RFID tag 128.

In addition to the tag ID, other information can be returned from the RFID tags. For example, the signals from the RFID tags may encode calibration information associated with tag mounting. Additionally or alternatively, the signals from the RFID tags may encode attenuation profile information. The attenuation profile information sent to the device may enable the processor 106 to more accurately estimate distances (when determined) between the device and the at least three RFID tags 124, 127, 128.

A strength of a signal from an RFID tag as received by the directional scanner 104 at a particular orientation of the directional scanner 104 can be used to determine an orientation of the directional scanner 104 associated with (e.g., indicative of the orientation at which the directional scanner 104 points at) the RFID tag. The strength of a signal from the RFID tag at a particular orientation of the directional scanner 104 depends at least in part on an angular offset of the RFID tag relative to a main lobe of the directional scanner 104 at the particular orientation. For example, at a given distance of the directional scanner 104 from an RFID tag, a strength of the signal received from the RFID tag may be greater when a peak of the main lobe is incident on the RFID tag than when an off-peak portion of the main lobe is incident on the RFID tag. The different signal strengths of signals from the RFID tags at different orientations of the directional scanner 104 (e.g., at different orientations of the detection region or the main lobe) may be used to determine a distance of the directional scanner 104 from a tag and a direction of the tag relative to the device coordinate system 192. For example, for a fixed distance of the directional scanner 104 from an RFID tag, a strength of the signal received from the RFID tag at the first orientation 112 will be greater than or less than a strength of the signal received from the RFID tag at the second orientation 114 based on a location of the RFID tag relative to the main lobe at the first and second orientations 112, 114. For example, the closer an RFID tag is to a peak of the main lobe, the stronger the signal received from the RFID tag.

To illustrate, in an example, a peak of the main lobe is at a center of the detection region. In this example, a strength of a signal from an RFID tag increases as the center of the detection region approaches the RFID tag. For example, the RFID tag 124 may be at a center of the beam at the first orientation 112 and the RFID tag 124 may be off-center at another orientation. In this example, a strength of the signal received from the RFID tag 124 at the first orientation 112 will be greater than a strength of the signal received from the RFID tag 124 at the other orientation.

The processor 106 is configured to determine a signal peak for each of at least three candidate RFID tags (collectively signal peaks 177) that include the at least three RFID tags 124, 127, 128, and to select the at least three RFID tags 124, 127, 128 based on selection criteria. The candidate RFID tags may correspond to the RFID tags for which the processor 106 is able to resolve a signal peak. For example, the positioning system 100 may be configured to use a three point algorithm, and during use, the positioning system 100 may resolve a signal peak for four RFID tags 121, 124, 127, 128, which correspond to the candidate RFID tags. In this example, the processor 106 may be unable to resolve a signal peak for the rest of the multiple RFID tags in FIG. 1, and therefore the rest of the RFID tags are not considered candidate RFID tags. In this example, the processor 106 is configured to select the at least three RFID tags 124, 127, 128 from the four candidate RFID tags 121, 124, 127, 128 based on the selection criteria.

In some examples, the selection criteria may correspond to a level of non-collinearity. To illustrate, the processor 106 may select the RFID tags 124, 127, and 128 as the at least three RFID tags based on determining that the set of RFID tags 124, 127, 128 is more non-collinear than the set of RFID tags 121, 124, 127; the set of RFID tags 121, 127, and 128; and the set of RFID tags 121, 124, and 128.

In some examples, the selection criteria corresponds to the amount of collected data. To illustrate, the processor 106 may select the RFID tags 124, 127, 128 as the at least three RFID tags based on determining that the amount of signal data collected for the RFID tags 124, 127, 128 during the scan is greater than the amount of signal data collected for the RFID tag 121 during the scan. Selecting the RFID tags that have the most collected data may improve the accuracy of the estimate of the orientation associated with the signal peak.

To determine the signal peaks 177, the directional scanner 104 provides the processor 106 data indicative of the signals received from the at least three non-collinear candidate RFID tags. The processor 106 processes the data indicative of the received signals to determine magnitudes 165 of the received signals. The processor 106 is configured to determine the signal peaks 177 for the at least three RFID tags 124, 127, 128 based on the magnitudes 165 of the signals from the at least three RFID tags 124, 127, 128.

Figure 5:
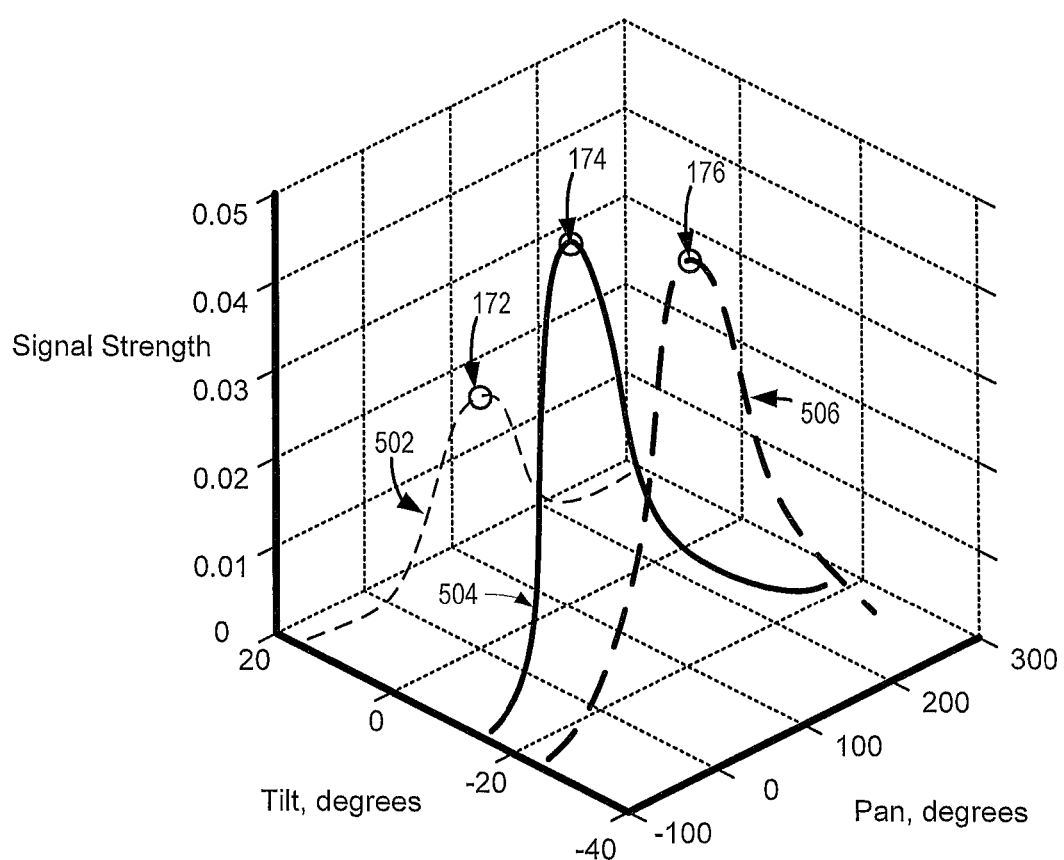
FIG. 5 illustrates an example of curves of signal strength versus scanner orientation for three RFID tags.

In some examples, one or more of the signal peaks 177 are determined using a mathematical model to estimate the signal peak 177 based on the magnitudes 165. In some of these examples, the mathematical model enables use of a relatively small number of samples to predict a peak. In some of these examples, the processor 106 is configured to determine the orientations associated with the received signals based on the time stamps associated with the orientation information 182 from the orientation detector 113 and based on the time stamps associated with the received signals. The processor 106 is configured to use an interpolation function (e.g., a spline fit or a polynomial fit) on samples arranged based on the time stamps. For example, FIG. 5 illustrates an example of curves 502, 504, 506 indicating pan and tilt angles (orientation) of the directional scanner 104 versus magnitude based on signals received from the at least three RFID tags 124, 127, and 128, respectively. In the example illustrated in FIG. 5, the curve 502 corresponds to a curve of pan and tilt angles of the directional scanner 104 based on signal samples from which the magnitudes 165 associated with the M signals from the RFID tag 124 are derived and based on the orientation information 182 indicating an orientation of the directional scanner 104 associated with each of the M signals from the RFID tag 124. The signal peak 172 corresponds to a peak of the curve 502. In the example illustrated in FIG. 5, the curve 504 corresponds to a curve of pan and tilt angles of the directional scanner 104 based on signal samples from which the magnitudes 165 associated with the N signals from the RFID tag 127 are derived and based on the orientation information 182 indicating an orientation of the directional scanner 104 associated with each of the N signals from the RFID tag 128. The signal peak 174 corresponds to a peak of the curve 504. In the example illustrated in FIG. 5, the curve 506 corresponds to a curve fit of pan and tilt of the directional scanner 104 based on signal samples from which the magnitudes 165 associated with the Q signals from the RFID tag 128 are derived and based on the orientation information 182 indicating an orientation of the directional scanner 104 associated with each of the Q signals from the RFID tag 128. The signal peak 176 corresponds to a peak of the curve 506.

The processor 106 is configured to determine peak signal strengths 181 for the signal peaks 177 associated with the at least three RFID tags 124, 127, 128. For example, the processor 106 may determine a peak signal strength 183 of the signal peak 172 associated with the RFID tag 124, may determine a peak signal strength 184 of the signal peak 174 associated with the RFID tag 127, may determine a peak signal strength 186 of the signal peak 176 associated with the RFID tag 128.

The positioning system 100 includes a pose estimator 140. As used herein, the term "pose estimator" may include a hardware system and/or software that is executable to perform one or more functions described herein with reference to the pose estimator 140. For example, the pose estimator 140 may include the processor 106, a controller, or other logic-based device that performs operations described herein with reference to the pose estimator 140 based on instructions stored on a tangible and non-transitory computer readable storage medium, such as a computer memory. Alternatively or additionally, the pose estimator 140 may include a hard-wired device that performs operations described herein with reference to the pose estimator 140 based on hard-wired logic of the hard-wired device.

In some examples, the processor 106 is configured to determine orientation data 163 based on the orientation information 182 and based on the signal peaks 172, 174, 176. For example, the signal peak 172 for the RFID tag 124 may be based on the curve 502. In this example, the processor 106 may be configured to determine an orientation 111 associated with the signal peak 172 of the curve 502. As another example, the signal peak 174 for the RFID tag 127 may be based on the curve 504, and the processor 106 may be configured to determine an orientation 117 associated with the signal peak 174 of the curve 504. As another example, the signal peak 176 for the RFID tag 128 may be based on the curve 506. In this example, the processor 106 may be configured to determine an orientation 115 associated with the signal peak 176 of the curve 506.

In some examples, the pose estimator 140 is configured to determine distance data 188 indicating a distance of the device 102 from each of the at least three RFID tags 124, 127, 128. For example, the pose estimator 140 may be configured to employ the 3-point estimation algorithm, and may be configured to determine the distance data 188. In other examples, the pose estimator 140 does not determine the distance data 188. The pose estimator 140 may be configured to employ the 5- or the 7-point estimation algorithm, and may not determine the distance data 188. In some examples in which the distance data 188 is determined, the distance data 188 is determined based on time-of-flight data. In other examples, the distance data 188 is determined based on the peak signal strengths 183, 184, 186 and calibration data.

To illustrate, in an example, the pose estimator 140 determines a distance 190 between the device 102 (e.g., an origin of the device coordinate system 192) and the RFID tag 124 based on the peak signal strength 183 and scaling factors associated with the RFID tag 124. The scaling factors associated with the RFID tag 124 are determined (e.g., during a calibration process) at least in part based on calibration or attenuation profile information in a data payload returned from the RFID tag 124, based at least in part on calibration or attenuation profile information stored in a look-up table, or using a mathematical model that describes attenuation of signals from the RFID tag 124. The scaling factors are used at least in part to account for attenuation (of signals from the RFID tag 124) associated with mounting environment conditions of the RFID tag 124.

In another example, the pose estimator 140 determines a distance 191 between the device 102 (e.g., an origin of the device coordinate system 192) and the RFID tag 127 based on the peak signal strength 184 and scaling factors associated with the RFID tag 127. The scaling factors associated with the RFID tag 127 are determined (e.g., during a calibration process) at least in part based on calibration or attenuation profile information in a data payload returned from the RFID tag 127, based at least in part on calibration or attenuation profile information stored in a look-up table, or using a mathematical model that describes attenuation of signals from the RFID tag 127. The scaling factors are used at least in part to account for attenuation (of signals from the RFID tag 127) associated with mounting environment conditions of the RFID tag 127.

In another example, the pose estimator 140 determines a distance 193 between the device 102 (e.g., an origin of the device coordinate system 192) and the RFID tag 128 based on the peak signal strength 186 and scaling factors associated with the RFID tag 128. The scaling factors associated with the RFID tag 128 are determined (e.g., during a calibration process) at least in part based on calibration or attenuation profile information in a data payload returned from the RFID tag 128, based at least in part on calibration or attenuation profile information stored in a look-up table, or using a mathematical model that describes attenuation of signals from the RFID tag 128. The scaling factors are used at least in part to account for attenuation (of signals from the RFID tag 128) associated with mounting environment conditions of the RFID tag 128.

In some examples, the pose estimator 140 determines the distances 190, 191, 193 based on Equations 1-3, where $k_{1(124)}$ and $k_{2(124)}$ are scaling factors associated the RFID tag 124 and determined during calibration of the directional scanner 104, $k_{1(127)}$ and $k_{2(127)}$ are scaling factors associated the RFID tag 127 and determined during calibration of the directional scanner 104, $k_{1(128)}$ and $k_{2(128)}$ are scaling factors associated the RFID tag 128 and determined during calibration of the directional scanner 104, $d_{124}$ corresponds to the distance 190, $s_{124}$ corresponds to the peak signal strength 183, $d_{127}$ corresponds to the distance 191, $s_{127}$ corresponds to the peak signal strength 184, $d_{128}$ corresponds to the distance 193, and $s_{128}$ corresponds to the peak signal strength 186.

$$d_{124} = k_{1(124)} + \frac{k_{2(124)}}{s_{124}^2} \quad \text{Equation 1}$$

$$d_{127} = k_{1(127)} + \frac{k_{2(127)}}{s_{127}^2} \quad \text{Equation 2}$$

$$d_{128} = k_{1(128)} + \frac{k_{2(128)}}{s_{128}^2} \quad \text{Equation 3}$$

In some examples, the pose estimator 140 uses the orientation data 163 and the distance data 188 in conjunction with relative location information 195 of the at least three RFID tags 124, 127, 128 relative to the object coordinate system 194 to determine a pose 196. In some examples, the relative location information 195 is determined using a measurement tool, such as a motion capture application, a laser tracker, a tape measure, a computer aided design model, etc. Alternatively or additionally, in other examples, the relative location information 195 is at least partially determined using a transformation matrix to transform a position of an RFID tag in the device coordinate system 192 to the object coordinate system 194.

In some examples, the pose estimator 140 uses the orientation data 163 and the distance data 188 to determine a relative relationship between the at least three RFID tags 124, 127, 128 relative to the device coordinate system 192, and uses the relative location information 195 to retrieve or determine a relative relationship between the at least three RFID tags 124, 127, 128 relative to the object coordinate system 194. In some examples, the pose estimator 140 determines a relationship (e.g., a transformation matrix 197) between the device coordinate system 192 and the object coordinate system 194 using the relative relationship between the at least three RFID tags 124, 127, 128 relative to the device coordinate system 192 and the relative relationship between the at least three RFID tags 124, 127, 128 relative to the object coordinate system 194. Examples of determining the transformation matrix 197 are described in more detail below with reference to FIGS. 6 and 7.

In some examples, the pose 196 corresponds to the relationship between the device coordinate system 192 and the object coordinate system 194 (e.g., a transformation matrix 197). Alternatively or additionally, in some examples, the pose 196 is determined using the relationship between the device coordinate system 192 and the object coordinate system 194 (e.g., using the transformation matrix 197). For example, once the transformation matrix 197 is determined, a pose of the device 102 in the device coordinate system 192 (which is known using the orientation detector 113) can be transformed to the object coordinate system 194 to represent the pose of the device 102 relative to the object coordinate system 194 using the transformation matrix 197.

In some examples, the transformation matrix 197, the pose 196, or a combination thereof is used in robotic motion planning or automobile navigation. For example, the device 102 may include an automobile or a robot that is configured to move. The processor 106 may use the transformation matrix 197, the pose 196, or a combination thereof, to determine a 3D position of the automobile or the robot relative to an environment in which the automobile or the robot operates. The 3D position of the automobile or the robot relative to the environment may be used to determine, update, or inform a navigation solution.

Although description above focuses primarily on determining the pose 196 of the device 102 using peaks from three RFID tags, the at least three RFID tags 124, 127, 128 used to determine the pose 196 of the device 102 may include more than three RFID tags. In examples in which the processor 106 is configured to determine a pose of the device 102 based on detected peak signal strengths of signals from three RFID tags, the processor 106 may employ a three-point algorithm. For example, the processor 106 may employ a three-point algorithm as described below with reference to FIGS. 6 and 7. In other examples, the at least three RFID tags 124, 127, 128 may include more than three RFID tags.

For example, the at least three RFID tags 124, 127, 128 may include five RFID tags. In these examples, the processor 106 is configured to determine five signal peaks associated with five non-collinear and non-co-planar RFID tags as described above with reference to the signal peaks 177. In these examples, the processor 106 is additionally configured to determine five peak signal strengths associated with the five signal peaks as described above with reference to the peak signal strengths 183, 184, 186. In these examples, the processor 106 does not determine distance data indicating distances between the directional scanner 104 and the five RFID. In these examples, the processor 106 is additionally configured to determine orientation data indicating orientations of the directional scanner 104 associated with the five peak signal strengths as described above with reference to the orientation data 163, and to use a five point algorithm to determine the pose 196 based on the orientation data, the distance data, and the relative location information 195.

As another example, the at least three RFID tags 124, 127, 128 may include seven RFID tags. In these examples, the processor 106 is configured to determine seven signal peaks associated with seven non-collinear RFID tags as described above with reference to the signal peaks 177. In these examples, the processor 106 is additionally configured to determine seven peak signal strengths associated with the seven signal peaks as described above with reference to the peak signal strengths 183, 184, 186. In these examples, the processor 106 does not use measured distance data between the directional scanner 104 and the seven RFID tags. In these examples, the processor 106 is additionally configured to determine orientation data indicating orientations of the directional scanner 104 associated with the seven peak signal strengths as described above with reference to the orientation data 163, and to use a seven point algorithm to determine the pose 196 based on the orientation data, the distance data, and the relative location information 195.

Thus, the positioning system 100 is configured to determine a pose of the device 102 based on orientation data indicating orientations of the directional scanner 104 associated with determined peak signal strengths associated with the at least three RFID tags. Determining the pose based on the peak signal strengths associated with RFID tags may provide for more reliable pose estimation indoors as compared to GPS systems that have limited access to GPS signals indoors. Additionally, in contrast to optical pose estimation devices, determining the pose based on the peak signal strengths associated with the RFID tags may enable determining the pose without line of sight to the RFID tags.

An example of determining the transformation matrix 197 of FIG. 1 based on the distance data 188, the orientation data 163, and the known relative locations of the at least three RFID tags 124, 127, 128 relative to the object coordinate system 194 is described with reference to FIGS. 6 and 7 and Equations 4-13. The transformation matrix 197 of FIG. 1 may be determined (as described with reference to FIGS. 6 and 7 and Equations 4-13) by the pose estimator 140 of FIG. 1, the processor 106 of FIG. 1, or a combination thereof.

Figure 6:
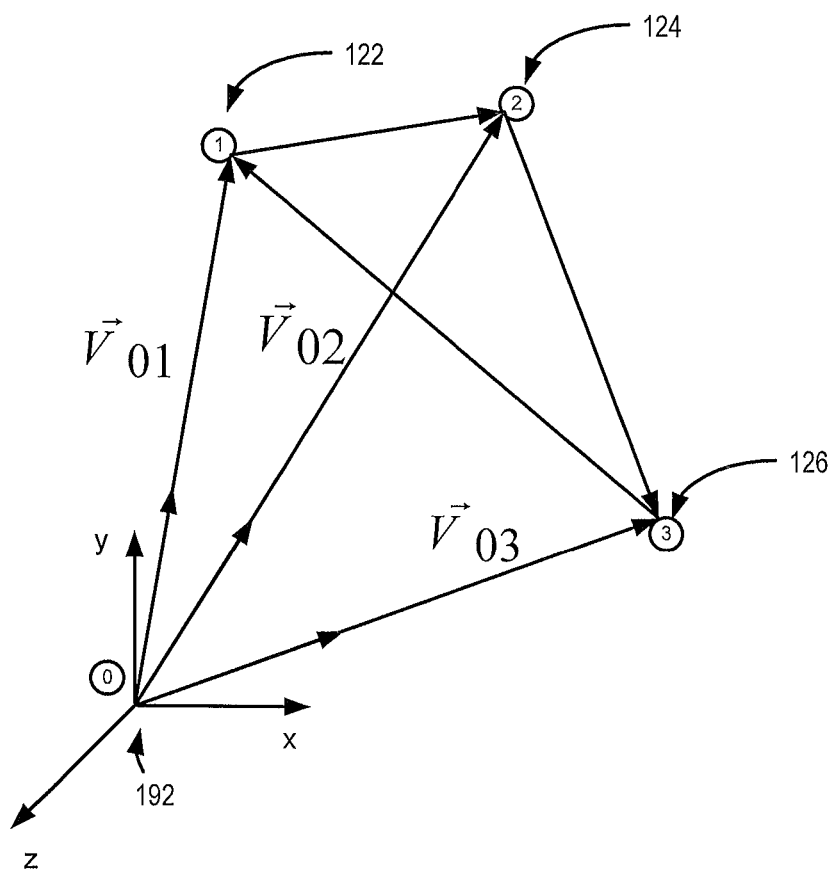
FIG. 6 illustrates an example of direction vectors between a device coordinate system and three RFID tags.
Figure 7:
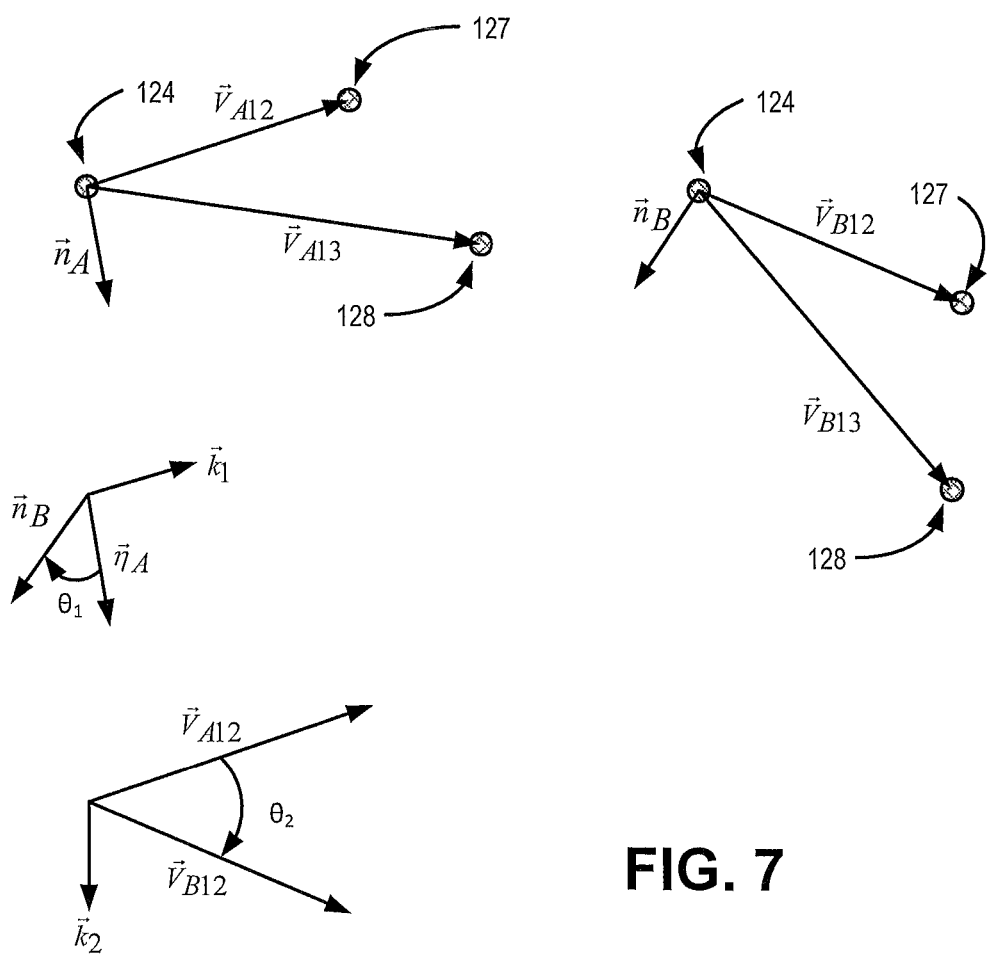
FIG. 7 illustrates an example of vector diagrams used in the derivation of a 3-point method pose estimation algorithm.

FIG. 6 illustrates direction vectors $\vec{V}_{O1}$, $\vec{V}_{O2}$, $\vec{V}_{O3}$ between the device 102 of FIG. 1 and the at least three RFID tags 124, 127, 128 relative to the device coordinate system 192, and vectors between the at least three RFID tags 124, 127, and 128. FIG. 7 illustrates vectors $\vec{V}_{A12}$ and $\vec{V}_{A13}$ between the RFID tag 124 and the RFID tag 127 and between the RFID tag 124 and the RFID tag 128, respectively, in the device coordinate system 192. FIG. 7 also illustrates vectors $\vec{V}_{B12}$ and $\vec{V}_{B13}$ between the RFID tag 124 and the RFID tag 127 and between the RFID tag 124 and the RFID tag 128, respectively, in the object coordinate system 194.

Each of the direction vectors $\vec{V}_{O1}$, $\vec{V}_{O2}$, $\vec{V}_{O3}$ describes a distance and direction to a corresponding RFID tag from an origin of the device coordinate system 192. Each of the direction vectors $\vec{V}_{O1}$, $\vec{V}_{O2}$, $\vec{V}_{O3}$ is determined using the orientation data 163 of FIG. 1 to determine the direction (e.g., a unit vector) and the distance data 188 of FIG. 1 to determine the magnitude of the direction vector.

A relative relationship of the at least three RFID tags 124, 127, 128 to each other in the device coordinate system 192 is determined based on the direction vectors $\vec{V}_{O1}$, $\vec{V}_{O2}$, $\vec{V}_{O3}$. For example, in some aspects, the relative relationship between the at least three RFID tags 124, 127, 128 in the device coordinate system 192 corresponds to the vectors $\vec{V}_{A2}$ and $\vec{V}_{A13}$ of FIG. 7.

Additionally, a relative relationship of the at least three RFID tags 124, 127, 128 to each other in the object coordinate system 194 is retrieved or determined. In some examples, the relative location information 195 of FIG. 1 corresponds to or includes the direction vectors $\vec{V}_{B12}$ and $\vec{V}_{B13}$ from the RFID tag 124 to the RFID tag 127 and from the RFID tag 124 to the RFID tag 128 in the object coordinate system 194. FIG. 7 illustrates a direction vector $\vec{V}_{B12}$ from the RFID tag 124 to the RFID tag 127 in the object coordinate system 194 and illustrates a direction vector $\vec{V}_{B13}$ from the RFID tag 124 to the RFID tag 128 relative to the object coordinate system 194.

A vector normal $\vec{n}_A$ of the direction vectors $\vec{V}_{A12}$ and $\vec{V}_{A13}$ and a vector normal $\vec{n}_B$ of the direction vectors $\vec{V}_{B12}$ and $\vec{V}_{B13}$ may be determined as a cross product as in equations 4 and 5, respectively.

$$\vec{n}_A = \vec{V}_{A12} \times \vec{V}_{A13} \qquad \text{Equation 4}$$

$$\vec{n}_B = \vec{V}_{B12} \times \vec{V}_{B13} \qquad \text{Equation 5}$$

Axes of rotation $\vec{k}_1$ and $\vec{k}_2$ may be determined as a cross product as in equations 6 and 7, respectively.

$$\vec{k}_1 = \vec{n}_A \times \vec{n}_B \qquad \text{Equation 6}$$

$$\vec{k}_2 = \vec{V}_{A12} \times \vec{V}_{B12} \qquad \text{Equation 7}$$

A rotation angle $\theta_1$ about the axis of rotation $\vec{k}_1$ may be determined as a dot product of magnitudes of the vector normals $\vec{n}_A$ and $\vec{n}_B$ as in equation 8. A rotation angle $\theta_2$ about the axis of rotation $\vec{k}_2$ may be determined as a dot product of magnitudes of the direction vectors $\vec{V}_{A12}$ and $\vec{V}_{B12}$ as in equation 9.

$$\theta_1 = a\cos(|\vec{n}_A| \cdot |\vec{n}_B|) \quad \text{Equation 8}$$

$$\theta_2 = a\cos(|\vec{V}_{A12}| \cdot |\vec{V}_{B12}|) \quad \text{Equation 9}$$

Rotation matrices $R_1$, $R_2$, and $R_{12}$ may be determined using magnitudes of the axes of rotation $\vec{k}_1$ and $\vec{k}_2$ and using the rotation angles $\theta_1$ and $\theta_2$ based on Equations 10, 11, and 12, respectively $$R_1 = f_1(|\vec{k}_1|, \theta_1) \quad \text{Equation 10}$$

$$R_2 = f_1(|\vec{V}_2|, \theta_2) \quad \text{Equation 11}$$

$$R_{12} = R_1 \cdot R_2 \quad \text{Equation 12}$$

where $f_1(\ )$ corresponds to a function which generates a 3 by 3 rotation matrix from the following angle-axis definition:

$$f_1(\hat{k}, \theta) = \begin{bmatrix} k_x k_x v\theta + c\theta & k_x k_y v\theta - k_z s\theta & k_x k_z v\theta + k_y s\theta \\ k_x k_y v\theta + k_z s\theta & k_y k_y v\theta + c\theta & k_y k_z v\theta + k_x s\theta \\ k_x k_z v\theta - k_y s\theta & k_y k_z v\theta + k_x s\theta & k_z k_z v\theta + c\theta \end{bmatrix}$$

where $c\theta = \cos(\theta)$, $s\theta = \sin(\theta)$, $v\theta = 1 - \cos(\theta)$, and $\vec{k} = [k_x, k_y, k_z]$.

The transformation matrix 197 (e.g., $_A^B T$) may be determined based on Equation 13.

$$_A^B T = [R_{12}, [R_1 \vec{V}_{B12} - \vec{V}_{A12}]^T] \quad \text{Equation 13}$$

Figure 8:
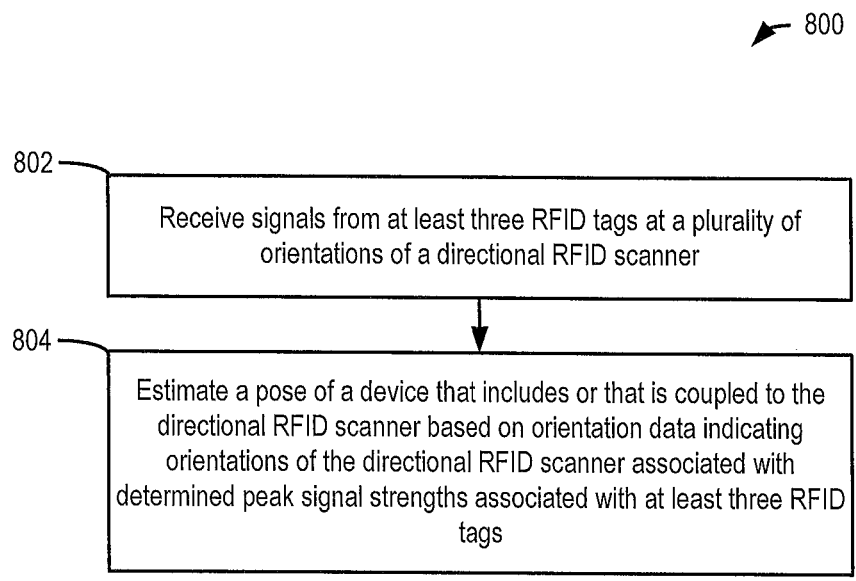
FIG. 8 is a flow chart of a method of determining a pose estimation.

FIG. 8 illustrates a method 800 for estimating a pose. In some examples, the method 800 is performed by the positioning system 100 of FIG. 1. The method 800 includes, at 802, receiving signals from at least three RFID tags at a plurality of orientations of a directional scanner. In some examples, the directional scanner corresponds to the directional scanner 104 described above with reference to FIG. 1. In some examples, the plurality of orientations correspond to the plurality of orientations 112, 114 . . . P described above with reference to FIG. 1. In some examples, the signals correspond to the M signals, to the N signals, and/or to the Q signals described above with reference to FIG. 1.

Receiving the signals from the at least three RFID tags at the plurality of measured orientations of the directional scanner includes changing an orientation of the directional scanner. In some examples, the orientation of the directional scanner is changed by changing a physical orientation of the directional scanner. In some examples in which the orientation of the directional scanner is changed by changing a physical orientation of the scanner, the orientation of the directional scanner is changed manually (e.g., as described with reference to FIGS. 3 and 4) or via a gimbal (e.g., as described above with reference to FIG. 2). In other examples, the orientation of the directional scanner is changed without changing the physical orientation of the directional scanner 104. For example, the orientation of the directional scanner may be changed by changing an orientation of the RFID beam using a phased array as described above with reference to FIG. 1.

The method 800 includes, at 804, estimating a pose of a device that includes the directional scanner based on orientation data indicating orientations of the directional scanner associated with determined peak signal strengths associated with the at least three RFID tags. In some examples, the pose of the device may be estimated by the processor 106 of FIG. 1, 2, 3, 4, or 10 (e.g., by the pose estimator 140 of FIG. 1, 2, 3, 4, or 10). In some examples, the pose corresponds to the pose 196, the transformation matrix 197, or both, as described above with reference to FIG. 1. In some examples, the orientation data corresponds to the orientation data 163 described above with reference to FIG. 1. In some examples, the peak signal strengths correspond to the peak signal strengths 183, 184, 186 described above with reference to FIG. 1.

In some implementations, the pose is estimated based on distance data indicating distances between the directional scanner and the at least three RFID tags. In some examples, the distance data corresponds to the distance data 188 of FIG. 1 and is determined as described above with reference to FIG. 1. In some implementations, the distances are determined based on the detected peak signal strengths as described above with reference to the peak signal strengths 183, 184, and 186 of FIG. 1.

In some implementations of FIG. 8, estimating the pose includes performing calibration operations to determine a relationship between a device coordinate system and an object coordinate system using a relative relationship between the at least three RFID tags in the device coordinate system associated with the device and a relative relationship between the at least three RFID tags in the object coordinate system. In some examples, the relative relationship between the at least three RFID tags in the device coordinate system corresponds to the direction vectors $\vec{V}_{A12}$ and $\vec{V}_{A13}$ described above with reference to FIGS. 6 and 7, and the relative relationship between the at least three RFID tags in the object coordinate system may correspond to the direction vectors $\vec{V}_{B12}$ and $\vec{V}_{B13}$. In some implementations, the relative relationship between the at least three RFID tags in the device coordinate system is determined based on the distance data and the orientation data as described above with reference to FIGS. 1 and 6. In some examples, the relative relationship between the at least three RFID tags in the object coordinate system is retrieved from a memory of the device. For example, the relative relationship between the at least three RFID tags in the object coordinate system may be determined and stored in a memory of the device prior to performing the method 800.

In some examples, the method 800 includes determining the plurality of orientations of the directional scanner based on orientation information from an inertial measurement unit. In some examples, the plurality of orientations of the directional scanner is determined (e.g., by the processor 106) based on the orientation information 182 as described above with reference to FIG. 1 and the IMU as described with reference to FIGS. 3-4.

Although the description associated with FIG. 8 above focuses primarily on determining pose of the device using peaks from three RFID tags, the at least three RFID tags used to determine the pose of the device may include more than three RFID tags. For example, the at least three RFID tags may include five RFID tags. In these examples, the method 800 may include determining five signal peaks associated with five non-collinear and non-co-planar RFID tags as described above with reference to the signal peaks 177. In these examples, the method 800 may additionally include determining five peak signal strengths associated with the five signal peaks as described above with reference to the peak signal strengths 183, 184, 186. In these examples, the method 800 may additionally include determining an orientation data indicating orientations of the directional scanner 104 associated with the five peak signal strengths as described above with reference to the orientation data 163, and using a five point algorithm to solve for the pose based on the orientation data and the relative location information 195.

As another example, the at least three RFID tags may include seven RFID tags. In these examples, the method 800 may include determining seven signal peaks associated with seven non-collinear RFID tags as described above with reference to the signal peaks 177. In these examples, the method 800 may additionally include determining seven peak signal strengths associated with the seven signal peaks as described above with reference to the peak signal strengths 183, 184, 186. In these examples, the method 800 may additionally include determining orientation data indicating orientations of the directional scanner 104 associated with the seven peak signal strengths as described above with reference to the orientation data 163, and using a seven point algorithm to solve for the pose based on the orientation data and the relative location information 195.

Thus, the method 800 determines a pose of the device based on orientation data indicating orientations of the directional scanner associated with determined peak signal strengths associated with at least three RFID tags. Determining the pose based on the peak signal strengths associated with RFID tags may provide for more reliable pose estimation indoors compared to GPS systems that have limited access to GPS signals indoors. Additionally, in contrast to optical pose estimation devices, determining the pose based on the peak signal strengths associated with the RFID tags may enable determining the pose without line of sight to the RFID tags.

Figure 9:
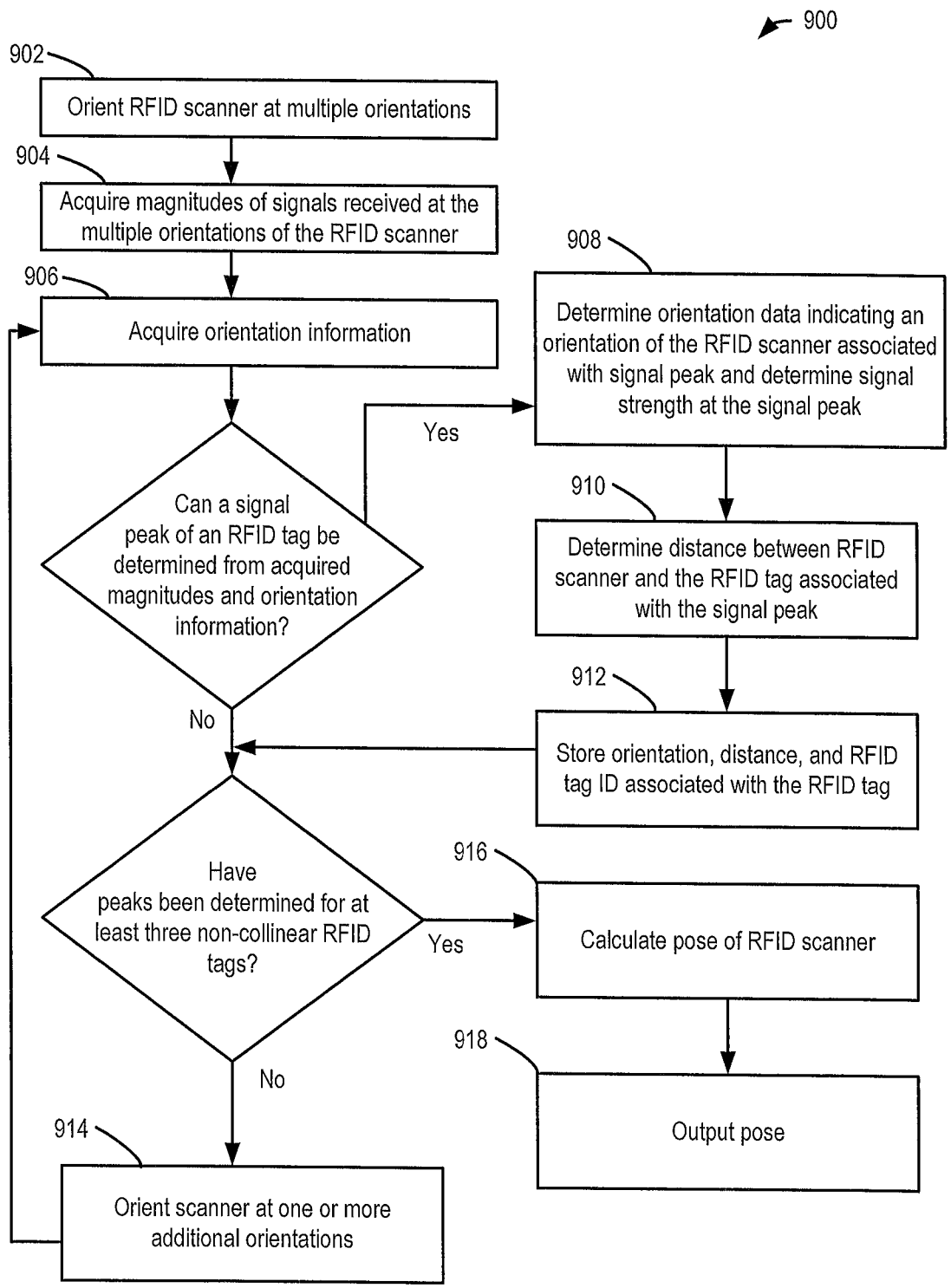
FIG. 9 is a flow chart of a method of determining a pose estimation.

FIG. 9 illustrates a method 900 for estimating a pose. In some examples, the method 900 is performed by the positioning system 100 of FIG. 1. The method 900 includes, at 902, orienting the directional scanner at multiple orientations. In some examples, the directional scanner is orientated at the multiple orientations by changing a physical orientation of the directional scanner. For example, a physical orientation of the directional scanner may be manually changed as described above with reference to FIGS. 1, 3, and 4. As another example, a physical orientation of the directional scanner may be changed using an automated device, such as a gimbal described above with reference to FIGS. 1 and 2.

The method 900 includes receiving one or more signals from one or more RFID tags at the multiple orientations. In some examples, the multiple orientations may correspond to the plurality of orientations 112, 114 . . . P described above with reference to FIG. 1, and the directional scanner receives M signals from a first RFID tag (e.g., the RFID tag 122) at M particular orientations of the plurality of orientations 112, 114 . . . P as described above with reference to FIG. 1. In another example, the multiple orientations correspond to the plurality of orientations 112, 114 . . . P described above, and the directional scanner may receive N signals from a second RFID tag (e.g., the RFID tag 124) at N particular orientations of the plurality of orientations 112, 114 . . . P as described above with reference to FIG. 1. In another example, the multiple orientations correspond to the plurality of orientations 112, 114 . . . P described above, and the directional scanner receives Q signals from a third tag (e.g., the RFID tag 126) at Q particular orientations of the plurality of orientations 112, 114 . . . P as described above with reference to FIG. 1.

The method 900 includes, at 904, acquiring magnitudes of signals received at the multiple orientations of the directional scanner. In some examples, the magnitudes of the signals received at the multiple orientations may be determined by the processor 106 of FIG. 1 and may correspond to the magnitudes 165 determined as described above with reference to FIG. 1.

The method 900 includes, at 906, acquiring orientation information indicating the multiple orientations of the directional scanner relative to the device coordinate system. In some examples, the orientation information corresponds to the orientation information 182 as described above with reference to FIG. 1, and the orientation information is acquired by the orientation detector 113, the processor 106, or both, as described above with reference to FIG. 1.

When a signal peak associated with an RFID tag can be determined from acquired magnitudes and orientation information, the method 900 includes, at 908, determining orientation data indicating an orientation of the directional scanner associated the signal peak and includes determining a signal strength at the signal peak. The orientation data may correspond to the orientation data 163 of FIG. 1, the peak signal strengths may correspond to the peak signal strengths 183, 184, and 186, and the orientation data and peak signal strengths may be determined by the processor 106 as described above with reference to FIG. 1. The method 900 additionally includes, at 910, determining a distance between the directional scanner and the RFID tag associated with the signal peak. For example, the distance may be determined as described above with reference to the distance data 188. The method 900 additionally includes, at 912, storing the orientation data 163, the distance data 188, and the RFID tag associated with the RFID tags for which the signal peaks are determined.

When a signal peak associated with an RFID tag can not be determined from the acquired magnitudes and orientation information and peaks have not been determined for at least three non-collinear tags, the method 900 includes, at 914, re-orienting the scanner at one or more additional orientations and iterating through the method 900 based on data acquired at the one or more additional orientations. In examples in which the directional scanner is configured to be manually physically moved to the multiple orientations, the device (e.g., the device 102) may provide an indication indicating that additional data should be collected to determine a pose. In some examples, the device provides an indication via a display (e.g., such as a display of the mobile communications device of FIG. 4) that indicates to an operator that the directional scanner should be re-oriented to collect additional data (e.g., magnitudes, orientation information, etc.).

When peaks have been determined for at least three non-collinear tags, the method 900 includes, at 916, estimating a pose of the directional scanner. In some examples, the pose corresponds to the pose 196 or the transformation matrix 197 and is determined by the processor 106, the pose estimator 140, or a combination thereof, as described above with reference to FIG. 1, 6, 7, or 8.

The method 900 additionally includes, at 918, outputting the pose determined at 916. In some examples, the pose is output at a display of the adapted communication device of FIG. 4.

Figure 10:
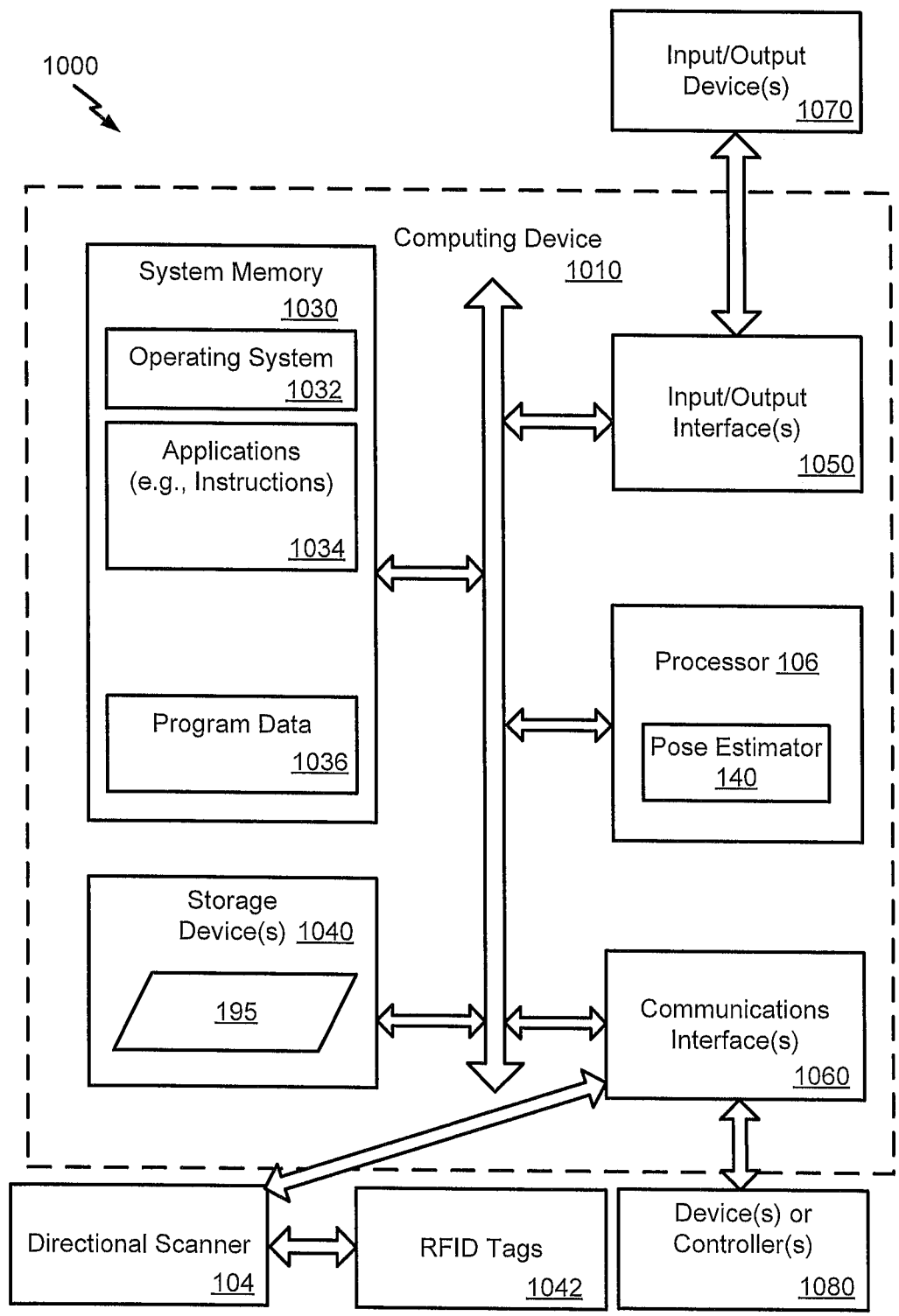
FIG. 10 is a block diagram of a particular example of a computing environment configured to support determination of a pose estimation according to the present disclosure.

FIG. 10 is an illustration of a block diagram of a computing environment 1000 including a device 1010 (e.g., a general purpose computing device) configured to support embodiments of computer-implemented methods and computer-executable program instructions (or code) according to the present disclosure. For example, the computing device 1010, or portions thereof, may execute instructions to perform the functions of the positioning system 100 or functions of a portion of the positioning system 100, such as the processor 106 or the pose estimator 140. The instructions to control the positioning system 100 (or of a portion of the positioning system 100, such as the processor 106 or the pose estimator 140) may include instructions to estimate a pose of a device that includes or is coupled to the directional scanner 104 based on orientation data indicating orientations of the directional scanner 104 associated with determined peak signal strengths associated with the at least three RFID tags. The computing device 1010, or portions thereof, may further execute instructions according to any of the methods described herein, such as the method 800 of FIG. 8 or the method 900 of FIG. 9.

The processor 106 may communicate with the system memory 1030, one or more storage devices 1040, one or more input/output interfaces 1050, one or more communications interfaces 1060, or a combination thereof. The system memory 1030 may include volatile memory devices (e.g., random access memory (RAM) devices), nonvolatile memory devices (e.g., read-only memory (ROM) devices, programmable read-only memory, and flash memory), or both. The system memory 1030 may include an operating system 1032, which may include a basic/input output system for booting the computing device 1010 as well as a full operating system to enable the computing device 1010 to interact with users, other programs, and other devices. The system memory 1030 may include one or more applications 1034 which may be executable by the processor 106. For example, the one or more applications 1034 may include instructions executable by the processor 1020 to determine a pose of a device as described above with reference to FIGS. 1-9.

The processor 1020 may also communicate with one or more storage devices 1040. For example, the one or more storage devices 1040 may include nonvolatile storage devices, such as magnetic disks, optical disks, or flash memory devices. The storage devices 1040 may include both removable and non-removable memory devices. The storage devices 1040 may be configured to store an operating system, images of operating systems, applications, and program data. The storage devices 1040 may also store the relative location information 195. In a particular embodiment, the system memory 1030, the storage devices 1040, or both, include tangible computer-readable media.

The processor 106 may communicate with one or more input/output interfaces 1050 that enable the computing device 1010 to communicate with one or more input/output devices 1070 to facilitate user interaction. The input/output interfaces 1050 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 1070 may include keyboards, pointing devices, displays, speakers, microphones, touch screens, and other devices. The processor 106 may detect interaction events based on user input received via the input/output interfaces 1050. Additionally, the processor 106 may send a display to a display device (e.g., the output device 180) via the input/output interfaces 550.

The processor 106 may communicate with the directional scanner 104, one or more devices 1080, or a combination thereof, via the one or more communications interfaces 1060. The one or more devices 1080 may include the device 102 of FIG. 1, the orientation detector 113 of FIGS. 1, 3, and 4; the rotation sensors 113A, 113B of FIG. 2, the three-axis IMU 113C of FIG. 2, or a combination thereof. The one or more communications interfaces 1060 may include wired Ethernet interfaces, IEEE 802 wireless interfaces, other wireless communication interfaces, or other network interfaces. The one or more devices 1080 may include host computers, servers, workstations, and other computing devices.

In conjunction with the described examples, a system or apparatus is disclosed that includes means for receiving signals from at least three RFID tags at a plurality of orientations of a directional scanner. In some examples, the means for receiving signals corresponds to the directional scanner 104 described above with reference to FIG. 1. The at least three RFID tags may correspond to the at least three RFID tags 124, 127, 128 described above with reference to FIG. 1. In some examples, the plurality of orientations corresponds to the plurality of orientations 112, 114 . . . P described above with reference to FIG. 1.

The apparatus additionally includes means for estimating a pose of a device that includes or that is coupled to the means for receiving signals based on orientation data indicating orientations of the means for receiving signals associated with determined peak signal strengths associated with the at least three RFID tags. In some examples, the means for estimating the pose corresponds to the processor 106 of FIG. 1 and the pose corresponds to the pose 196 or the transformation matrix 197 determined as described above with reference to FIG. 1, 6, 7, 8, or 9.

In some examples, the means for estimating the pose is configured to determine the plurality of orientations of the directional scanner based on orientation information from means for detecting orientation. For example, the orientation information may correspond to the orientation information 182 described above with reference to FIG. 1 and the means for detecting orientation may correspond to the orientation detector 113 described above with reference to FIG. 1, 2, 3, or 4.

In some examples, the means for estimating the pose is configured to estimate the pose based on distance data indicating distances between the means for receiving signals and the at least three RFID tags. For example, the means for estimating the pose may be configured to estimate the pose based at least in part on the distance data 188 of FIG. 1 as described above with reference to FIG. 1, 6, 7, 8, or 9. In some examples, the means for estimating the pose is configured to determine the distances based on the determined peak signal strengths. For example, the peak signal strengths may correspond to the peak signal strengths 183, 184, 186 described above with reference to FIG. 1, and the means for estimating the pose is configured to determine the distances based on the peak signal strengths 183, 184, 186 as described above with reference to FIG. 1, 6, 7, 8, or 9. In other examples, the means for estimating the pose is configured to determine the distances based on time of flight as described above with reference to FIG. 1. Note that in other examples (e.g., when a 5- or 7-point algorithm is used), the means for estimating the pose determines the pose without the distance data (e.g., the means for estimation the pose does not determine the distances).

In some examples, the means for estimating the pose is configured to determine a relationship between a device coordinate system associated with the device and an object coordinate system using a relative relationship between the at least three RFID tags in the device coordinate system and a relative relationship between the at least three RFID tags in the object coordinate system. For example, the relationship between the device coordinate system associated with the device and an object coordinate system may correspond to the transformation matrix 197 described above with reference to FIG. 1. Additionally, the relative relationship between the at least three RFID tags in the device coordinate system may correspond to the direction vectors $\vec{V}_{A12}$ and $\vec{V}_{A13}$, and the relative relationship between the at least three RFID tags in the object coordinate system may correspond to the direction vectors $\vec{V}_{B12}$ and $\vec{V}_{B13}$.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

The flowcharts, modules, or components shown in the attached figures may represent the hardware that operates based on software instructions and hardware logic, the software that directs hardware to perform operations, or a combination thereof. In particular, the pose estimator 140 described above with reference to FIGS. 1-10 transforms the processor 106 described above with reference to FIGS. 1-10 into a special purpose processor as compared to processors that do not have the pose estimator 140 described above with reference to FIGS. 1-10.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A positioning system, comprising:
an environment comprising a plurality of radio frequency identification (RFID) tags of known positions;
a directional scanner coupled to a device, the directional scanner configured to receive signals from the RFID tags; and
a pose estimator configured to:
determine signal peak data for each of the RFID tags based on scans of the environment for multiple orientations of the directional scanner relative to the environment, the signal peak data comprising signal peak strength at a signal peak and first orientation information of the directional scanner associated with the signal peak; and
after determination of the signal peak data:
receive scan data from the directional scanner and second orientation information for the device at a time of receipt of the scan data, the scan data comprising signals from at least three of the RFID tags of the plurality RFID tags; and
estimate a pose of the device based on the scan data, the second orientation information and the signal peak data.

2. The positioning system of claim 1, further comprising an inertial measurement unit, wherein the directional scanner is further configured to be manually moved to change an orientation of the directional scanner, and wherein the inertial measurement unit is configured to provide the first orientation information and the second orientation information.

3. The positioning system of claim 1, further comprising a gimbal including rotation sensors configured to provide the first orientation information and the second orientation information.

4. The positioning system of claim 3, wherein the rotation sensors include a tilt angle sensor and a pan angle sensor.

5. The positioning system of claim 1, wherein the directional scanner is a unidirectional scanner.

6. The positioning system of claim 1, wherein the pose estimator is further configured to estimate the pose based on distance data indicating distances between the directional scanner and each of the at least three RFID tags, and wherein the distances are determined based on the scan data and the signal peak data.

7. The positioning system of claim 6, wherein the pose estimator is further configured to determine a relationship between a device coordinate system and an object coordinate system using a relative relationship between the at least three RFID tags in the device coordinate system and a relative relationship between the at least three RFID tags in the object coordinate system.

8. The positioning system of claim 7, wherein the relative relationship between the at least three RFID tags in the device coordinate system is determined based on the distance data and the second orientation information.

9. A method comprising:
determining, at a pose estimator, signal peak data for each radio frequency identification (RFID) tag of an environment received by a directional scanner coupled to a device based on scans of the environment by the directional scanner for multiple orientations of the directional scanner relative to the environment, the environment comprising a plurality of RFID tags of known position, and the signal peak data comprising signal peak strength at a signal peak and first orientation information of the directional scanner associated with the signal peak;
receiving scan data from the directional scanner and second orientation information for the device at a time of receipt of the scan data, the scan data comprising signals from at least three of the RFID tags of the plurality RFID tags;

determining positions of the at least three RFID tags; and estimating a pose of the device based on the scan data, the second orientation information, and the signal peak data.

10. The method of claim 9, further comprising determining orientations of the directional scanner based on the first orientation information and the second orientation information, the first orientation information and the second orientation information received from an inertial measurement unit.

11. The method of claim 9, wherein determining the positions comprises determining distance data, the distance data indicating distances between the directional scanner and each of the at least three RFID tags.

12. The method of claim 11, wherein the distances are determined based on signal peak strengths from the signal peak data for each of the at least three RFID tags.

13. The method of claim 12, wherein estimating the pose includes determining a relationship between a device coordinate system associated with the device and an object coordinate system using a relative relationship between the at least three RFID tags in the device coordinate system and a relative relationship between the at least three RFID tags in the object coordinate system.

14. The method of claim 13, wherein the relative relationship between the at least three RFID tags in the device coordinate system is determined based on the distance data and the second orientation information.

15. The method of claim 14, wherein the relative relationship between the device coordinate system and the object coordinate system is determined using three RFID tags.

16. An apparatus, comprising:
means for determining signal peak data for each radio frequency identification (RFID) tag of an environment received by a directional scanner coupled to a device based on scans of the environment by the directional scanner for multiple orientations of the directional scanner relative to the environment, the environment comprising a plurality of RFID tags of known position, and the signal peak data comprising signal peak strength at a signal peak and first orientation information of the directional scanner associated with the signal peak;

means for receiving scan data from the directional scanner and second orientation information for the device at a time of receipt of the scan data, the scan data comprising signals from at least three of the RFID tags of the plurality RFID tags;

means for determining positions of the at least three RFID tags; and means for estimating a pose of the device based on the scan data, the second orientation information, and the signal peak data.

17. The apparatus of claim 16, further comprising means for detecting orientation configured to provide the first orientation information and the second orientation information to the means for receiving.

18. The apparatus of claim 16, wherein the means for estimating is configured to estimate the pose based on distance data indicating distances between the device and each of the at least three RFID tags.

19. The apparatus of claim 18, wherein the means for determining positions is further configured to determine the distance data based on signal peak strengths from the signal peak data for each of the at least three RFID tags.

20. The apparatus of claim 16, wherein the means for estimating is configured to determine a relationship between a device coordinate system associated with the device and an object coordinate system using a relative relationship between the at least three RFID tags in the device coordinate system and a relative relationship between the at least three RFID tags in the object coordinate system.

* * * * *